United States Patent [19]

Mak et al.

[11] Patent Number: 4,961,391

[45] Date of Patent: Oct. 9, 1990

[54] THERMAL TREATMENT PROCESS FOR ORGANICALLY CONTAMINATED MATERIAL

[75] Inventors: Kai K. Mak, Concord; Rudy G. Novak, Knoxville; Robert D. Fox, Knoxville; Richard W. Helsel, Knoxville, all of Tenn.

[73] Assignee: International Technology Corporation, Torrance, Calif.

[21] Appl. No.: 330,167

[22] Filed: Mar. 29, 1989

[51] Int. Cl.$^5$ .......................... F23G 5/06; F24B 14/00
[52] U.S. Cl. .................................. 110/346; 110/246; 432/14; 432/112; 432/113
[58] Field of Search ................. 432/14, 103, 107, 105, 432/111, 112, 113; 110/246, 346

[56] References Cited

U.S. PATENT DOCUMENTS

| | | | |
|---|---|---|---|
| 1,409,338 | 3/1922 | Fenton . | |
| 1,443,529 | 1/1923 | Dworzak | 432/112 |
| 1,909,587 | 5/1933 | Kuhl et al. . | |
| 2,217,665 | 10/1940 | Brown | 432/112 |
| 2,444,527 | 7/1948 | Pomeroy | 260/412.5 |
| 2,726,142 | 12/1955 | Reeve | 23/154 |
| 2,773,003 | 12/1956 | Brown et al. | 196/1 |
| 2,852,582 | 9/1958 | Stallings, Jr. et al. | 260/683.53 |
| 2,927,075 | 3/1960 | Brown | 208/208 |
| 3,009,541 | 11/1961 | Mas et al. | 183/120 |
| 3,140,155 | 7/1964 | Cull et al. | 23/277 |
| 3,220,798 | 11/1965 | Cull et al. | 23/155 |
| 3,287,234 | 11/1966 | Steel et al. | 203/49 |
| 3,692,668 | 9/1972 | McCoy et al. | 210/18 |
| 3,716,474 | 2/1973 | Hess et al. | 208/13 |
| 3,888,194 | 6/1975 | Kishigami et al. | 110/8 F |
| 3,933,989 | 1/1976 | Itoh et al. | 423/481 |
| 3,941,055 | 3/1976 | Itoh et al. | 110/18 |
| 4,018,879 | 4/1977 | Winnen | 423/481 |
| 4,100,255 | 7/1978 | Tschantre | 423/210 |
| 4,116,830 | 9/1978 | Krogsrund | 210/63 R |
| 4,125,593 | 11/1978 | Scheifley et al. | 423/481 |
| 4,132,640 | 1/1979 | Filzmoser | 210/68 |
| 4,133,273 | 1/1979 | Glennon | 110/346 |
| 4,140,066 | 2/1979 | Rathjen et al. | 110/235 |
| 4,198,384 | 4/1980 | Robinson | 423/488 |
| 4,222,823 | 9/1980 | Wickbold et al. | 201/2.5 |
| 4,226,712 | 10/1980 | Kamel | 210/710 |
| 4,230,053 | 10/1980 | Deardorff et al. | 110/346 |
| 4,236,464 | 12/1980 | Anderson et al. | 110/238 |
| 4,236,973 | 12/1980 | Robbins | 203/10 |
| 4,245,396 | 1/1981 | Maffet | 34/12 |
| 4,260,368 | 4/1981 | Karlsson | 432/112 |
| 4,311,103 | 1/1982 | Hirose et al. | 110/238 |
| 4,331,088 | 5/1982 | Gold | 110/346 |
| 4,402,274 | 9/1983 | Meenan et al. | 110/346 |
| 4,451,231 | 5/1984 | Murray | 432/113 |
| 4,541,346 | 9/1985 | Culliford | 432/113 |
| 4,738,206 | 4/1988 | Noland | 110/346 |

FOREIGN PATENT DOCUMENTS 0155022  8/1985  European Pat. Off. .

OTHER PUBLICATIONS

*Laboratory Evaluation of High-Temperature Destruction of Kepone and Related Pesticides,* by D. S. Duvall, and W. A. Rubey, University of Dayton Research Institute, Dayton, Oh. 45469, EPA-600/2-76-299, Dec. 1976, Municipal Environmental Research Laboratory.

(List continue on next page.)

*Primary Examiner*—Henry C. Yuen
*Attorney, Agent, or Firm*—Luedeka, Hodges & Neely

[57] ABSTRACT

A thermal treatment process employs an indirectly fired rotary kiln in which matrix material contaminated with organic substances such as dioxins, PCBs, PAHs, fuel oils, and the like is heated as the material is advanced through the kiln to cause components of the organics to be released as vapor. Purge gas of low oxygen content is conducted through the kiln at a relatively low velocity of from about 0.5 ft./sec. to about 10 ft./sec. to gently sweep the vaporized components of the organic substances from the kiln and to minimize the entrainment of solid particulates, and to produce an off gas mixture including the vaporized components. The off gas is conditioned after removal from the kiln to render it acceptable for discharge to the atmosphere. The oxygen concentration in the kiln is maintained at a sufficiently low level to substantially prevent combustion of the vaporized organic components in the kiln.

10 Claims, 2 Drawing Sheets

OTHER PUBLICATIONS

*Laboratory Evaluation of High-Temperature Destruction of Polychlorinated Biphenyls and Related Compounds*, by D. S. Duvall and W. A. Rubey, University of Dayton Research Institute, Dayton, Oh. 45469, EPA-600/2-7-7-228, Dec., 1977, Municipal Environmental Research Laboratory.

*Hazardous Material Incinerator Design+Criteria*, by L. Mason and S. Unger, EPA-600/2-79-198, Oct. 1979, Industrial Environmental Research Laboratory.

*Industrial Process Design for Pollution Control*, Nov., 1-3, 1972, vol. 5, American Institute of Chemical Engineers.

1 of 2 PB 211 323, Selected Water Resources, Abstracts PB 323, 12631, Environmental Protection Agency, Mar., 1972.

*Volatility of Organicochlorine Insecticides from Soil; I. Effect of Concentration, Temperature Air Flow Rate, and Vapor Pressure*, by W. J. Farmer, K. Igue, W. F. Spencer and J. P. Martin, Soil Sci. Soc. Amer. Proc., vol. 36, 1972.

*Pesticide Volatilization as Related to Water Loss from Soil*, W. F. Spencer and M. M. Cliath, J. Environ. Quality, vol. 2, No. 2, 1973.

*Effect of Bulk Destiny on the Diffusion and Volatilization of Dieldrin from Soil*, W. J. Farmer, K. Igue, and W. F. Spencer, J. Environ. Quality, vol. 2, No. 1, 1973.

*Comparative Volatilization and Dissipation Rates of Several Pesticides from Soil*, Ralph G. Nash, J. Agric. Food Chem., vol. 31, No. 2, 1983.

*Volatilization of Lindane and DDT from Soils*, W. D. Guenzi and W. E. Beard, Soil Sci. Soc. Amer. Proc., vol. 34, 1970.

*Factors Affecting the Volatilization of Insecticidal Residues from Soils*, C. R. Harris and E. P. Lichtenstein, Harris & Lichtenstein, Oct., 1961.

Literature references as follows: *Phosphate Rock Calcination in Fluid Beds $EM Dash$ an Update*, R. J. Priestly, P. Dorr-Oliver, Inc., Stamford, Conn., 1974.

*Refractory Shortage $EM Dash$ It's Real and It Will Be Here For a While Unless*, Anon., 33, Mas Met Prod, vol. 13, No. 1, Jan., 1975.

*Cadmium Volatilisation from Phosphate Rock*, W. M. Walker, J. R. Tuffley, Amdel Bull, No. 19, Apr. 1975.

*Energy Use In the Steel Industry $EM$ 2. Intensified Utilization of Waste Heat From the L-D Process*, J. K. Stone, Kaiser Ens Inc., I SM (Iron Steelmaker), vol. 2, No. 4, Apr., 1975.

*Cadmium Volatilisation From Phosphate Rock*, W. M. Walker, J. R. Tuffley, Amdel, Adelaide, South Aust., Natl Chem Ens Conf., 2nd, Proc., Surfers Paradise, Queensl, Aust., 1974.

*Fluidization in the Non-Ferrour Mineral Processing and Metal Industry*, M. A. Doheim, Assiut Univ. Egypt, Int J. Miner Process, vol. 3, No. 4, 1976.

*Production and Use of Formcoke*, Paul Schmafield, Dieter Lursi Mineroeltek, Frankfurt AM, Germany, Chemsa, vol. 1, No. 10, Aus. 1975.

THERMAL TREATMENT PROCESS FOR ORGANICALLY CONTAMINATED MATERIAL

The present invention relates to processes for the thermal treatment of matrix material contaminated with organic substances to decontaminate the material and enable its recovery.

Significant efforts are now being made toward cleaning up sites such as landfills, underground storage or dumping sites, and the like, which have been rendered environmentally unacceptable by contamination with organic substances. Often, removal and/or destruction of the contaminants can be achieved by subjecting the contaminated matrix material to a high temperature thermal treatment.

Known techniques for the thermal treatment of the matrix material, such as soil which has been contaminated with organic substances, typically involve essentially simultaneous desorption and thermal destruction of the substances. For example, it is a common practice to subject the material to high temperature treatment in a direct-fired rotary kiln sufficient to accomplish rapid desorption and/or thermal destruction of the substances in the kiln.

In such a direct fired system, the fuel source used to provide the heating is combusted inside the kiln in the presence of a matrix containing the unwanted organic substances. This introduces substantial volumes of gases to the kiln which must be dealt with. The volatilization of the organics and evaporation of water is a first source of gases. In addition, the flame within the kiln generates combustion gases which further contribute to the volume of the offgases. These gases ordinarily must be further treated before they can be safely released to the atmosphere. The cost of treating the gases is, of course, a function of the quantity of gases which is to be treated. Larger gas volumes require larger and more expensive equipment which increases the overall cost of the process. And, in addition to being more expensive than smaller equipment, the larger equipment is more difficult and in some cases practically impossible to transport. Thus, it would be advantageous to substantially reduce the volume of off gas which must be treated to reduce the overall cost of the process and to facilitate transportation of the process equipment from site to site.

Conventional processes also typically require mixing of the contaminated material with large volumes of hot oxidizing gases under vigorous agitation to achieve the desired treatment. As a result, excessive quantities of airborne solid particulates are generated which tend to become entrained in, and carried away with, the gases discharged from the kiln. This problem is especially severe where the contaminated material is in a finely comminuted form such as dry, dusty or sandy soil, for example. Normally, the particulates must be removed before the gases are released to the atmosphere which adds another significant expense to the process. It is therefore desirable to minimize both the quantity of the gases and the quantity of entrained particulates in the gases leaving the kiln.

Furthermore, it is generally desirable to minimize the temperature to which the matrix material must be raised to effect removal of the unwanted substances in order to reduce energy requirements and ash production.

Accordingly, it is an object of the present invention to provide a thermal treatment process for the treatment of matrix material contaminated with organic substances such as dioxins, PCBs, PAHs, fuels, oils and the like.

It is another object of the invention to provide a process of the character described having a minimum quantity of off-gas.

It is a further object of the invention to provide a process of the character described in which the organic contaminants are removed from the matrix material in an indirectly heated kiln.

A further object of the invention is the provision of a process of the character described which accomplishes removal of the organic contaminants from the matrix material with minimum energy requirements.

The above and other objects and advantages of the present invention will be further described and may best be understood with reference to the accompanying drawings in which.

Figure 1:
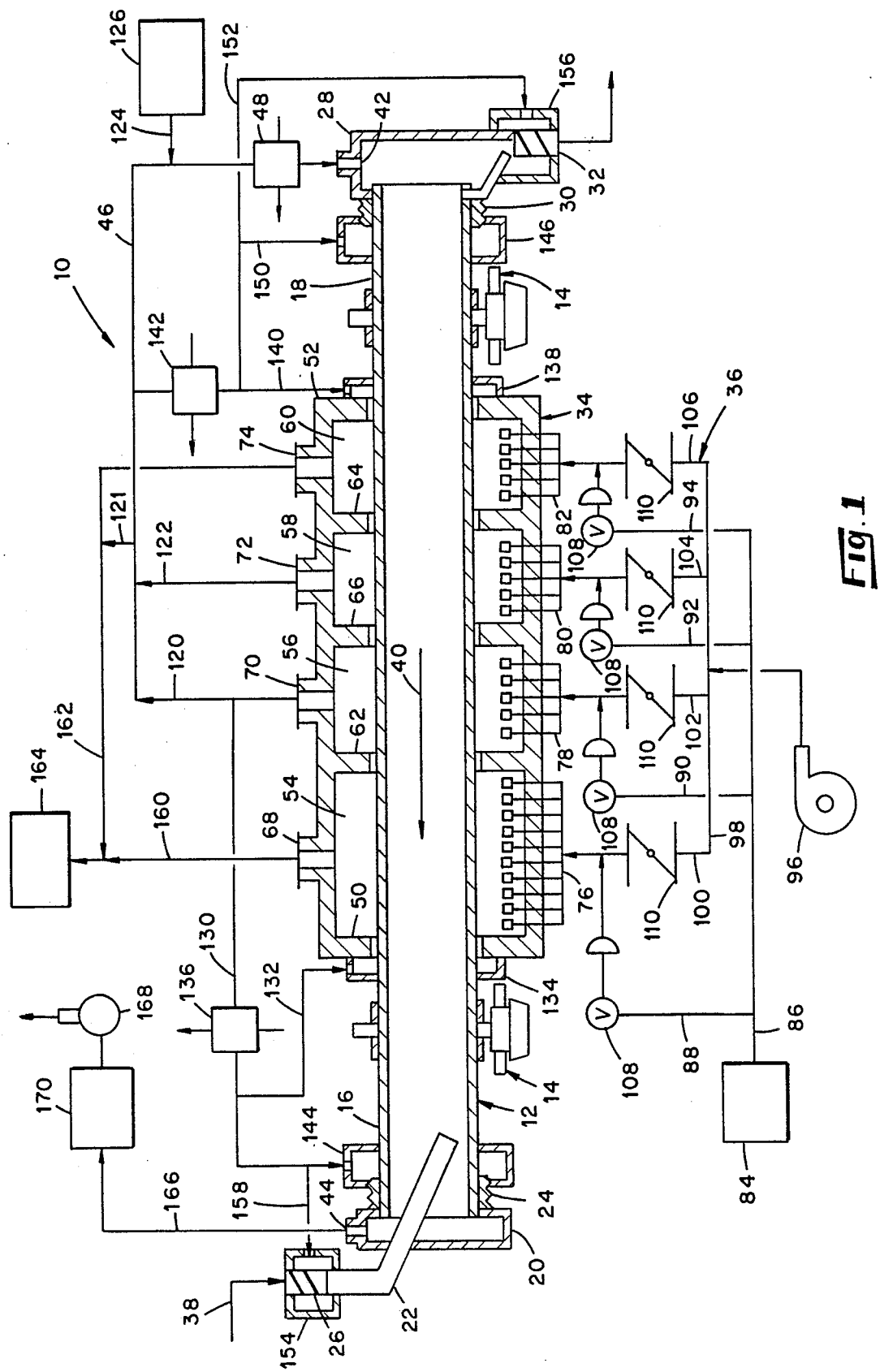
FIG. 1 is a diagrammatic view illustrating apparatus for use in the thermal desorption process of the present invention.

In general, the present invention comprises a thermal treatment process for matrix material contaminated with organic substances. Typically, the matrix material is soil or some other essentially solid particulate substrate which is at ambient temperature and may contain from about 0.1% to about 30% by weight moisture, for example. Organic contaminant concentrations may range from about 0.01% to about 30% by weight and the contaminants may be incorporated into the matrix in numerous forms and/or combinations thereof. For example, the organics may be in a discrete, liquid or solid form dispersed in the matrix and/or they may be adsorbed onto or absorbed into the material making up the matrix.

Exemplary contaminant organic substances which may be present in the matrix and which are removed and by the process of the present invention include dioxins, PCBs, pesticides, PAHs, pentachlorophenol, hydrocarbon fuels, waste oils and other organics.

The present process is carried out using a rotary kiln having a material feed end and a material discharge end, the kiln being configured to advance the material from the feed end to the discharge end as it rotates. The process comprises feeding the matrix material to the feed end of the kiln and indirectly heating the material in the kiln as it is advanced toward the discharge end to substantially remove the organic substances and to cause components of the organic substances to be released as vapor. As used herein with reference to the organic contaminants, the term "component" or "components" means the organic contaminants themselves, reaction products thereof which may be formed in the process, fragments formed from thermal degradation, and the like. Thus, the process contemplates removal by both "desorption" of the substances unaccompanied by any significant reactions as well as essentially in/situ thermal destruction with resulting reaction products including fragments and compounds or elements produced by pyrolysis.

Purge gas is passed through the kiln at a relatively low velocity of from about 0.5 ft./sec. to about 10 ft./sec. to gently sweep the vaporized components of the organic material from the interior of the kiln, and to produce an off gas mixture including the organic components but with minimum entrainment of solid particulates in the off-gas stream. The oxygen concentration in the kiln is maintained at a sufficiently low level to substantially prevent combustion of the vaporized organic components in the kiln.

The off gas mixture is removed from the kiln and is treated to render the gas acceptable for discharge to the atmosphere. Such treatment may include high temperature destruction or recovery by condensation, adsorption, or other means. The matrix is discharged at the discharge end of the kiln substantially free of the organic contaminants.

The provision of a purge gas velocity in the range of from about 0.5 to about 10 ft./sec. represents a substantially reduced volumetric flow of gas through the kiln as compared to known thermal treatment processes, particularly those employing a direct-fired kiln. As a result, the size and thus the expense and inconvenience associated with the off gas treatment equipment is substantially reduced.

The present process is particularly well suited for use with finely divided matrix material such as dusty, dry or sandy soil, or any other essentially solid material which tends to generate significant amounts of airborne particulates when agitated. Although some agitation in the kiln is desirable to promote uniform heating it is preferred that mixing be minimized to avoid generation of airborne particles. The quantity of airborne particulates which are generated and entrained in the gas mixture leaving the kiln is further minimized by maintaining the flow velocity of the purge gas relatively low and by inhibiting combustion in the kiln.

Figure 2:
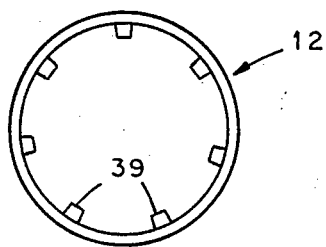
FIG. 2 is an end view of a cylindrical chamber in which contaminated material is treated.

Referring now to the drawings, FIGS. 1 and 2 illustrate features of preferred apparatus for use in carrying out various steps of the process of the present invention. The details of the equipment and its operation including necessary valving, piping, pumps, etc., are generally omitted from the drawings and from the following description for the purpose of clarity since it is believed that those of ordinary skill in the art will readily recognize the suitability and adaptability of conventional apparatus, control techniques, etc., to the process. However, certain detailed aspects of the equipment and its operation will be discussed to a limited extent in connection with the description of particular parts of the process.

With initial reference to FIG. 1, there is shown a rotary kiln system 10 including an elongate, cylindrical chamber 12 in which the matrix material is treated as will be described. The chamber 12 is supported for rotation about its axis by roller assemblies 14, and is rotatably driven by suitable means such as a chain or gear drive, for example (not shown). Preferably, the rotational speed imparted to the chamber 12 by the drive means is adjustable to between from about 0.8 rpm to about 8 rpm so that optimum treatment in terms of residence time can be achieved depending on the type and condition of the material to be treated, the extent of its contamination, and the dimensions of the chamber. By way of example, the chamber 12 may range in length from about 10 ft. to about 60 ft., and range in diameter from about 2 ft. to about 14 ft. Although other size kilns are acceptable, it is noted that larger kilns are difficult or impossible to transport and smaller kilns normally provide inefficient throughput values.

The chamber 12 is open at its opposite ends to define a feed end 16 and a discharge end 18, the latter of which is disposed at an elevation below that of the former so that the material is advanced through the chamber 12 toward the discharge end 18 as the chamber rotates. The feed end 16 is enclosed by a feed hood 20, which in turn supports a feed chute 22 through which contaminated material enters the chamber 12. The chute 22 and hood 20 do not rotate with the chamber 12 so that a rotating connection exists between the hood and chamber. An annular seal 24 of suitable configuration is provided at the rotating connection between the hood 20 and the chamber 12 to restrict flow of gas into or out of the kiln through the connection. In general, the seal 24 includes a stationary flange and a rotating flange (not shown) which are in rotating contact and which are connected to the hood 20 and chamber 12, respectively. The annular seal 24 is spring loaded so that the stationary flange and the rotating flange are continuously pressed against each other to maintain a tight seal.

At its upper end, the feed chute 22 is provided with a double flap valve mechanism 26 which controls the rate of material feed to the chamber 12. The valve mechanism is also configured to restrict gas flow through the chute 22 in either direction. Each flap valve operates in opposite sequence to the other. One valve closes while the other one opens such that a seal is always maintained to minimize air infiltration.

The discharge end 18 of the chamber 12 is enclosed by a non-rotating discharge hood 28. An annular seal 30 of suitable configuration is provided at the rotating connection between the hood 28 and the chamber 12 and is substantially identical to the seal 24 located at the feed end 16. The hood 28 is configured to receive material spilling out of the discharge end 18 of the cylinder 12 and directs the same through a double flap valve mechanism 32 which is substantially identical to the valve mechanism 26. The mechanism 32 restricts gas flow in either direction but does not significantly impede exit of the material from the hood 28.

A substantial portion of the length of the chamber 12 is rotatably received within a sectional furnace 34. The furnace 34 includes a burner assembly generally indicated at 36 which is fueled with a hydrocarbon such as natural gas, oil, or the like. As depicted, that portion of the length of the cylinder 12 which is contained within the furnace is exposed externally to the heat produced by the burner. This heat is transferred through the wall of the cylinder 12 to the interior of the cylinder, hence the interior of the cylinder 12 is heated "indirectly" as referred to herein. Additional features of the furnace 34 and burner assembly 36 will be described hereinafter.

It is to be noted from the foregoing general description that the kiln 10 employed in the process of the invention is an indirectly fired kiln in that material in the chamber 12 is not directly exposed to the heat source as would be the case with a so-called "direct-fired" kiln where the material is exposed to open burning. Thus, material delivered to valve 26 as by conduit 38 enters the chamber 12 at the feed end 16 and is heated primarily by contact with the inside wall of the chamber 12 and by the gas in the chamber interior during movement of the material from feed end to the discharge end 18. Uniform heating is promoted by gently mixing the material as it moves through the chamber 12 which may be accomplished by the use of spaced-apart back-mixing flights such as the elongate friction bars 39 shown in FIG. 2.

The friction bars are preferably oriented generally parallel to the axis of the chamber 12, and are spaced and dimensioned to minimize unnecessary agitation of the material while ensuring sufficient mixing to promote uniform heating. For example, in a chamber having a 6 ft. diameter internal chamber, the bars 39 spaced are circumferentially about 1.5 ft. from adjacent bars and preferably have a truncated conical configuration in cross-bar section. In this example, each bar has a base width of about 1 in., a width across the top of 0.5 in., a height of 0.5 in. and walls converging at about a 60° angle with respect to the base surface.

As the material moves through the chamber 12 and is heated contaminant organic substances are removed from the matrix by desorption and/or thermal decomposition to produce components of the organics which are released into the interior of the chamber 12 as vapor. It is believed that heating the material to a temperature of about 500° F. to about 1600° F. with a residence time of about 5 minutes to about 100 minutes will accomplish substantially complete removal of most contaminant substances likely to be present. A residence time within the range of 15 to 45 minutes is preferred. Although higher temperatures may be used, it is preferred that the material be heated no higher than about 1800° F. The moisture in the material is also released into the interior of the chamber 12 as water vapor.

The components of the organic substances are swept from the chamber 12 by a purge gas which preferably flows countercurrent to the matrix movement as indicated by the direction of arrow 40 in FIG. 1. The purge gas enters the kiln 10 through an inlet opening 42 located in the discharge hood 28, and exits the kiln 10 as off-gas carrying the organic components and water vapor through an outlet opening 44 located in the feed hood 20 after traversing the length of the chamber 12. It is preferred that the temperature of the incoming purge gas be maintained in the range of from about 150° F. to about 1600° F., most preferably from about 600° F., to about 1600° F. and that the off-gas temperature be maintained in the range of from about 400° F. to about 1500° F. to avoid condensation of vaporized components and water.

As mentioned above, the velocity of the purge gas is maintained in the range of from about 0.5 to about 10 ft./sec. to gently sweep the vaporized organic components from the kiln. Through the use of such low velocities, the quantity of gas exiting the chamber 12 and the entrainment of particulates is minimized. Typically, a velocity below about 5 ft/sec. can be maintained without adversely affecting the rate of removal of the organics from the material.

In addition, the oxygen concentration in the chamber 12 is maintained at a sufficiently low level to substantially prevent combustion of the vaporized components in the chamber 12. This prevents the introduction of an additional gas volume which would otherwise be produced as combustion gases, and limits the creation of turbulent gas flow conditions within the chamber 12. Maintenance of an oxygen concentration in the chamber 12 below about 8% is sufficient for these purposes. However, if $H_2$ is generated from organic decomposition and/or volatilization maintenance of the oxygen concentration below about 4% is preferred since the maximum recommended oxygen percent for hydrogen is about 4% per NFPA guidelines. The oxygen content is preferably kept under about 4% by maintaining the oxygen concentration of the incoming purge gas below about 2% while maintaining the combined rate of leakage of air into the chamber 12 through the seals 24 and 30, and the valves 26 and 32 at a sufficiently low level so that the increase in the oxygen content of the purge gas due to infiltration does not exceed about 2%.

An inert purge gas containing less than about 2% oxygen is preferably obtained using the combustion gases produced in the furnace 34 by the burner assembly 36. In the burner 36, the conditions under which the fuel is burned can be precisely controlled to a near stoichiometric balance with little or no oxygen remaining in the gases, thereby making them most useful as a purge gas in the present invention. Also, the burner combustion gases, being at an elevated temperature of from about 150° F. to about 1600° F., do not require heating before being introduced into the chamber, thereby providing a positive effect on the overall thermal efficiency of the process.

It is noted that the moisture which is evaporated from the material can itself be utilized as a source of purge gas to carry away vaporized components since the water vapor or steam is essentially inert under the prevailing circumstances. Thus, it is possible to reduce the quantity of purge gas required to sweep the vaporized organic components from the chamber 12 based on the amount of moisture in the feed material. For example, in the case in which the feed material contains about 15% moisture, the quantity of purge gas required can be reduced about 10% over that required where the feed material contains about 10% moisture, with substantially equivalent gas velocities in the chamber 12.

Combustion gases are delivered to the inlet 42 in the discharge hood 28 from the furnace 34 through a main conduit 46 as will be described. If necessary, a thermostatically controlled heat exchanger 48 can be used to control the temperature of the combustion gas entering the inlet 42.

In the use of combustion gases from the furnace 34 as purge gas, it is important to consider the effect of air infiltration which can result in undesirable elevations in the oxygen content of the gas. Air infiltration to the furnace 34 can occur at the rotating connection between the furnace walls and the outside wall of the rotating chamber 12. This is true even when seals are provided at these locations as some leakage of ambient air may occur due to the relative movement between the two walls. Since ambient air contains approximately 21% oxygen, even small amounts of air infiltration into the furnace 34 can cause the oxygen concentration of the combustion gases at the inlet 42 to exceed the desired 2% level. Thus, it is desirable to reduce or substantially eliminate air infiltration in the furnace 34.

Infiltration of air or oxygen from another source can be reduced somewhat by maintaining the pressure in the furnace interior adjacent moving connections at or slightly above atmospheric pressure although this is considered to be somewhat wasteful and is difficult to control. In accordance with the present invention, an effective measure against the effect of air infiltration to the furnace 34 involves the use of one or more interior combustion zones containing burner combustion gases which are isolated from the atmosphere surrounding the kiln, and from which combustion gases are drawn for use in providing the purge gas in the chamber 12 and for other uses as will be described.

In a preferred embodiment, one or more interior combustion zones are provided by dividing the furnace interior into three or more combustion zones. The zones are preferably annular in configuration and in the illustration of FIG. 1 are indicated by reference characters 54, 56, 58 and 60. Outer zones 54 and 60 are adjacent the furnace side walls 50 and 52, respectively, which are configured with their edges in close proximity to the outer surface of the chamber 12 so that only a small annular space exists between the walls and the chamber. Inner zones 56 and 58 are defined between the outer zones 54 and 56 by annular partition walls 62 and 64 and are in turn divided from each other by annular partition wall 66. Partition walls 62, 64 and 66 thus divide zones 54 and 56, 56 and 58, and 58 and 60, respectively, and are configured like the walls 50 and 52 of the furnace 34 with their edges in close proximity to the outer wall of the chamber 12 so that only a small annular space exists between the partition walls and the outer surface of the chamber.

Each zone 54, 56, 58 and 60 is provided with a combustion gas outlet 68, 70, 72 and 74, respectively, and a bank of burners 76, 78, 80 and 82, respectively, which comprise the burner assembly 36 referred to above. Fuel is provided to the burner banks 76, 78, 80 and 82 from a fuel source 84 such as a natural gas line or an oil tank, for example, via main gas conduit 86 and branch gas conduits 88, 90, 92 and 94, respectively. Air is provided to the burner banks from blower 96 through main air conduit 98 and branch air conduits 100, 102, 104 and 106, respectively. Individual control of the flow of fuel to the burner banks is provided by valves 108 located in the branch gas lines, and individual control of the flow of air is provided by valves 110 located in the branch air lines. As noted, the introduction of fuel and combustion air are regulated to establish a stoichiometric balance thereby conserving fuel and advantageously producing combustion gases of low oxygen content.

The combustion conditions and the pressure in zones 54, 56, 58 and 60 therefore are controlled principally by manipulation of valves 108 and valves 110 which may be accomplished automatically by suitable conventional monitoring and feedback control systems. It is preferred that the pressure in inner zones 56 and 58 be maintained at a slightly higher level than that in the outer zones 54 and 60, and that the pressure in the outer zones be maintained at or slightly above atmospheric pressure. Consequently, any flow of combustion gases between the chambers occurs substantially only from the inner zones 56 and 58 to the outer zones 54 and 60. As a result, the oxygen concentration in the inner zones 56 and 58 remains substantially unaffected by any air infiltration to the outer zones 54 and 60.

Substantially oxygen-free combustion gases (below about 2% $O_2$) are drawn from the inner combustion zones 56 and 58 through outlets 70 and 72, respectively, and are delivered to main combustion gas conduit 46 via branch conduits 120 and 122 for use in providing the purge gas in the chamber 12. It is noted that the combustion gases in conduit 46 may be supplemented or replaced by an essentially inert gas such as nitrogen, for example, through conduit 124 from a suitable source indicated at 126 which may be a liquid nitrogen-/evaporator system, for example. Nitrogen or other inert gas can be supplied in the event that the flow of combustion gases in conduit 46 is interrupted, for example, or to ensure maintenance of an oxygen concentration in the purge gas entering the chamber 12 of below about 2% which may be accomplished by monitoring the oxygen content of the combustion gases flowing in conduit 46 and adding sufficient inert gas through conduit 124 to keep the oxygen concentration below this level.

In accordance with one feature of the present invention, combustion gases from zones 56 and 58 are used in the minimization of air infiltration at the various potential leak sites in and around the kiln. For example, it is preferred that the combustion gas be applied at the locations where the furnace walls 50 and 52 meet the outer wall of the rotating chamber 12 in a manner which reduces air infiltration at these locations.

As illustrated in FIG. 1, combustion gas is drawn from conduit 120 and is conducted to the locations at which the furnace wall 50 meets the chamber wall by conduits 130 and 132 and is applied under pressure at this location in a housing of suitable configuration such as an annular enclosure 134 attached to the outside surface of the furnace wall 50. The clearance between the annular enclosures 134 and 138 and the rotating chamber 12 is preferably less than about 2 inches.

A pressure is developed inside the enclosure 134, preferably about 2 inches water column higher than atmosphere, which is sufficient to provide a barrier against movement of outside air into the furnace 34 through the space between the furnace wall 50 and the outer wall of the chamber 12. That is, the gas will be permitted to exit from the enclosures both to the outside and to the zones 54 and 60. As a result, any infiltration to the furnace 34 is limited substantially to infiltration of combustion gas as opposed to ambient air. Before the gas is applied, it may be cooled to a temperature compatible with any seals which may be used at this location by a heat exchanger 136 of suitable configuration. Similar provision is made at the opposite longitudinal end of the furnace 34 where an annular enclosure 138 receives a supply of substantially oxygen-free gas from main combustion gas conduit 46 through conduit 140 cooled in a heat exchanger 142.

The combustion gas from zones 56 and 58 is also preferably utilized at the locations of the feed and discharge end seals 24 and 30 to reduce air infiltration. Enclosures 144 and 146 of suitable configuration are constructed around the seals and supported by suitable means (not shown) on the feed and discharge hoods 20 and 28, respectively, or on the seals themselves as desired. Combustion gas is delivered to enclosure 144 through conduit 130 after cooling and is delivered to enclosure 146 through conduit 150 which is connected to conduit 140 downstream of the heat exchanger 142. Combustion gas in the enclosures 144 and 146 is pressurized to create a barrier zone against infiltration of air through the seals 24 and 30. Thus, any leakage of gas through the seals 24 and 30 is of the combustion gas rather than outside air.

Further use of the substantially oxygen-free combustion gas from zones 56 and 58 involves application of the gas to enclosures 154 and 156 which are constructed around double flap valves 26 and 32. The gas is delivered to enclosure 154 through conduit 158 which is connected to conduit 130 downstream of the heat exchanger 136, and is delivered to the enclosure 156 by means of conduit 152 having been cooled after passage through heat exchanger 142. Combustion gas in the enclosures 154 and 156 provides a barrier against air infiltration into the valves 26 and 32 to ensure that any leakage into the valves is of combustion gas as opposed to ambient air.

Combustion gas in outer zones 54 and 60 exits the furnace 34 at outlets 68 and 74 through conduits 160 and 162 and may be utilized elsewhere in the process to recover its heat value, for example, represented diagrammatically at 164.

The purge gas containing the components of the organic substances exits the feed end hood 20 at outlet 44 through conduit 166 and is passed in conduit 166 to a further treatment or conditioning unit indicated diagrammatically at 170 when the gas is rendered acceptable for discharge to the atmosphere. Such conditioning unit may include a high temperature secondary combustion unit where unwanted components are destroyed, or other gas treatment process involving recovery of the components, and in which the gas is rendered environmentally acceptable for discharge to the atmosphere.

Movement of the gas out of the chamber 12 and through the unit 170 may be assisted by one or more I.D. fans 168 located downstream of the unit 170. Preferably, the fans 168 are operated in such a manner as to maintain the pressure in the chamber 12 at or slightly below atmospheric.

Figure 3:
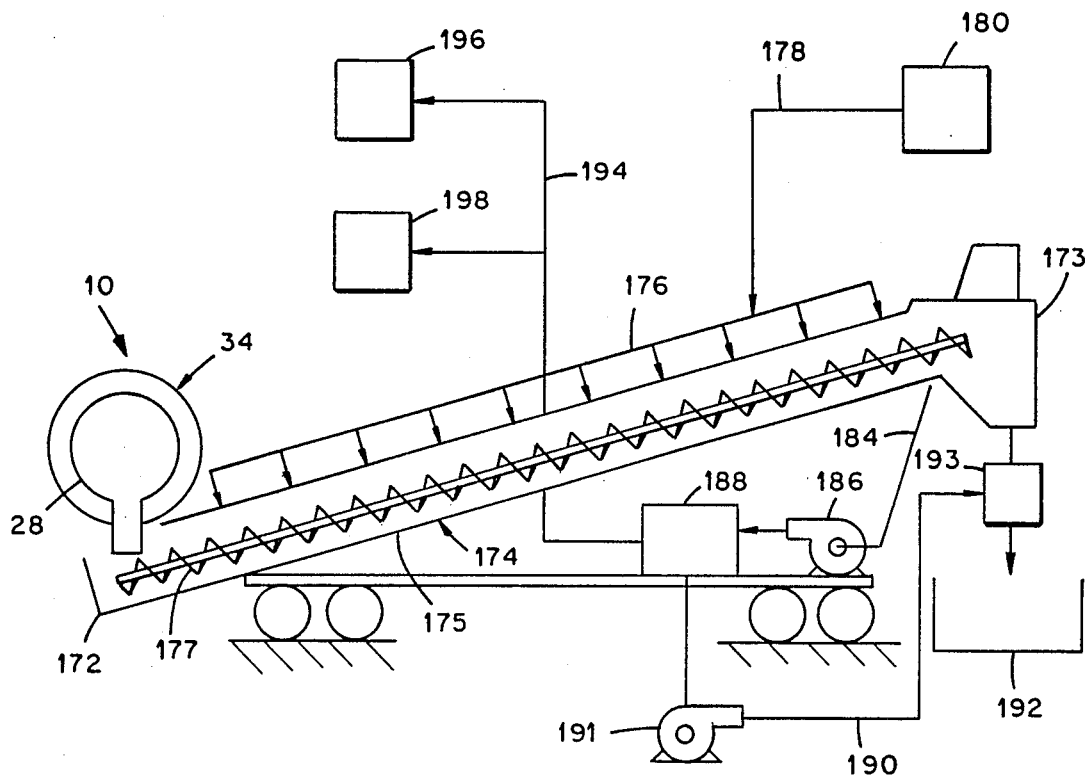
FIG. 3 is a diagrammatic view illustrating an ash handling system.

An additional technique for obtaining gas having a low oxygen concentration for use in providing the purge gas is shown in FIG. 3 which illustrates an ash handling system for treating matrix material upon its discharge from the chamber 12. It is noted that the term "ash" is used broadly to identify the treated matrix material and is not intended to imply that the material is burned or oxidized in the chamber 12 in the conventional sense.

As will be more fully described, the system accomplishes cooling and moisturization of the discharged material for ease of handling while producing steam which can be utilized as purge gas in the chamber 12. The apparatus is illustrated diagrammatically since it is believed that those of ordinary skill in the art will readily recognize that conventional equipment, monitors, controls, valving, etc. can be used and/or adapted for use in the system.

According to this feature of the invention, the matrix material which is delivered through valve 34 at the discharge hood 28 enters the lower feed end 172 of an inclined screw conveyor 174. The moisture content of the material is typically essentially zero. As indicated above, the temperature of the material may be in the range of from about 500° F. to about 1600° F.

Preferably, the conveyor is inclined upwardly from the feed end 172 at an angle of less than about 40° with respect to horizontal and has an overall length between the feed end 172 and a discharge end 173 of about 40 ft., although it is understood that the length may vary depending upon a number of factors such as the expected inlet temperature of the material, the expected throughput, and the desired discharge height, for example. Regarding the latter factor, it is preferred that the conveyor be configured to provide a discharge height of up to about 20 ft. to enable discharge to a mixer, a truck, ash bin or other large disposal unit.

The conveyor 174 includes a housing 175, preferably a U-trough design, in which the material is conveyed using a typical screw arrangement 177 comprising a helicoid mounted on a pipe or shaft turning in a trough, and including mixing flights. Movement of the material by such an arrangement results in substantial mixing which is desirable for uniform cooling and steam production.

An arrangement of water sprays 176 is provided along a substantial portion of the length of the conveyor 174 in the overhead portion of the housing 175. Water is delivered to the sprays 176 through conduit 178 from a suitable source indicated at 180 which may be water recovered from other portions of the process, for example. Preferably, the water is sprayed directly onto the material ascending the conveyor 174 which, due to the high temperature of the material and mixing action, rapidly vaporizes the water and fills the interior portion of the housing 175 with steam.

The steam is taken off at the upper, discharge end 173 of the conveyor 174 in conduit 184 and may have a temperature in the range of from about 150° F. to about 300° F., for example. Movement of steam out of the interior of the housing 175 through conduit 184 may be assisted by one or more I.D. fans indicated at 186 from which the steam is conducted to a sump 188. The pressure in the housing 175 is preferably maintained at about 0.1 in. $H_2O$.

In order to maintain a reasonably low gas velocity in the housing to minimize the entrainment of particulates, it is preferred that the cross-sectional area of the housing 175 be expanded at about 2 to 5 ft. downstream of the feed location such that the steam velocity will be kept to below about 10 ft./sec. Also, the quantity of water delivered in the sprays is preferably controlled so that the first 70 to 90% of the conveyor length is used for cooling the material, preferably to at least as low as 100° F., and for generating steam (no appreciable increase in the moisture content of the material); and so that the remaining 10 to 30% of the conveyor length is used for slight moisturizing of the material, preferably up to a moisture content of below about 15%.

The material exits the discharge end 173 of the conveyer 174 through a double flap valve 193 into a receptacle 192 of suitable configuration. Water collected in the sump 188 is pumped through conduit 190 by pump 191 and may be sprayed directly onto the material entering the receptacle as an aid to minimize the generation of dust.

Steam is conducted from the sump 188 in conduit 194 to the chamber 12 illustrated and described above with reference to FIG. 1 by a suitable distribution means indicated at 196 to conduit 124 and then to 46. The steam in conduit 194 may also be utilized to minimize air infiltration at the locations of the seals 24 and 30 in the enclosures 144 and 146, to minimize air infiltration between the furnace 34 and the chamber 12 in the enclosures 134 and 138, and to minimize air infiltration at the location of the valves 26 and 32 in the enclosures 154 and 156, by suitable piping indicated diagrammatically at 198.

Although preferred embodiments of the present invention have been described in the foregoing detailed description, it will be understood that the invention is capable of numerous rearrangements, substitutions, alterations, and modifications without departing from the scope and spirit of the following claims.

What is claimed is:

1. A thermal treatment process for matrix material contaminated with organic substances employing an elongate rotary kiln having a feed end and a discharge end and a wall defining an interior space extending longitudinally therethrough from said feed end of said kiln to said discharge end of said kiln, an external surface of said kiln adjacent said interior space and separated therefrom by the wall thereof, means for rotating the kiln about its longitudinal axis with said kiln being configured to advance the matrix material through the kiln from the feed end to the discharge end as the kiln is rotated by said means for rotating, said process comprising:

employing said means for rotating to rotate the kiln about its longitudinal axis;

feeding the matrix material into the feed end of the kiln so that the material is advanced by the rotating kiln from the feed end toward the discharge end;

combusting a hydrocarbon fuel to produce high temperature combustion gases having a relatively low oxygen concentration of below about 2%;

contacting the high temperature combustion gases with the external surface of the rotating kiln so that heat is indirectly transferred to the interior space of the kiln through the wall of the kiln from the external surface thereof to thereby heat the matrix material advancing through the kiln in an indirect manner and cause components of the organic substances and water therein to be released from the material as vapor;

conducting at least a portion of the low oxygen content combustion gases into the kiln to provide a purge gas with an oxygen content below about 2% for being conducted through the kiln adjacent the advancing material to displace the vapor from adjacent the surface of the advancing material;

controlling the flow velocity of the purge gas to provide a relatively low velocity of from about 0.5 feet per second to about 10 feet per second to gently sweep the vapor from the material advancing through the kiln so as to avoid entrainment of particulate matter in the purge gas and to thereby produce an off-gas mixture containing the purge gas together with collected vapor and having a relatively low level of particulates;

maintaining air infiltration to the rotating kiln at a sufficiently low rate to avoid an increase in the level of oxygen contained in the purge gas flowing through the kiln to a level at which sufficient oxygen would exist to support combustion of organic vapors released from the materials;

removing the off-gas mixture from the kiln;

treating the off-gas mixture following the removal from the kiln to render the off-gas mixture acceptable for discharge to the atmosphere; and discharging the material from the discharge end of the kiln substantially free of the hazardous organic substances.

2. The process of claim 1, wherein the velocity of the purge gas is maintained below about 5 ft/sec.

3. The process of claim 1, further comprising gently mixing the material as it is advanced through the kiln with a minimum of agitation so as to provide uniform heating while avoiding the generation of significant quantities of airborne particulates.

4. The process of claim 1, wherein the kiln is rotated in an external furnace and the hydrocarbon fuel is combusted in the furnace to heat the kiln which in turn heats the matrix material to effect vaporization of components of the organic substances from the matrix material and the combustion gas is conducted from the furnace to the kiln for use in providing the purge gas as aforesaid.

5. The process of claim 4, wherein the combustion gas is utilized to provide substantially all of the purge gas and its temperature entering the kiln is maintained in the range of from about 600° F. to about 1600° F.

6. The process of claim 4, wherein the kiln projects out of the furnace and the process further comprises applying the combustion gases at the adjacency of the kiln and furnace to provide a pressurized zone containing the combustion gases between the adjacency and ambient air to limit infiltration of ambient air into the furnace through the adjacency between the furnace and the kiln.

7. The process of claim 4, wherein the kiln projects out of the furnace and the process further comprises combusting the hydrocarbon gas in the furnace in an outer combustion zone which communicates with the adjacency between the furnace and the kiln, and in an inner combustion zone which is isolated from the ambient air by said outer zone, maintaining the pressure in the inner zone at least as high as the pressure in the outer zone to limit movement of gas from the outer zone to the inner zone, and drawing combustion gas for utilization in the purge gas predominantly only from the inner zone, whereby the oxygen concentration in the inner zone is substantially unaffected by infiltration of ambient air through said adjacency between the furnace and the kiln into the gas in the outer zone.

8. The process of claim 2, 3, 4, 5, 6, 7, or 1, further comprising contacting the material following its discharge from the kiln with water to produce steam and to cool the material, and utilizing the steam to provide at least a portion of the purge gas stream.

9. The process of claim 2, 3, 4, 5, 6, 7, or 1, wherein the temperature of the off gas mixture leaving the kiln is maintained in the range of from about 400° F. and the temperature of the material leaving the kiln is maintained below about 1800° F. and above about 500° F.

10. A thermal treatment process for matrix material contaminated with organic substances employing an elongate rotary kiln having a feed end and a discharge end and a wall defining an interior space extending longitudally therethrough from said feed end of said kiln to said discharge end of said kiln, an external surface of said of kiln adjacent said interior space and separated therefrom by the wall of the kiln, means for rotating the kiln about its longitudinal axis with said kiln being configured to advance the matrix material through the kiln from the feed end to the discharge end as the kiln is rotated by said means for rotating, said process comprising:

employing said means for rotating to rotate the kiln about its longitudinal axis;

feeding the matrix material into the feed end of the kiln so that the material is advanced by the rotating kiln from the feed end to the discharge end;

providing a multiple zone heating chamber for supplying heat to the external surface of the kiln, the heating chamber being adapted to receive the kiln therethrough such that opposite longitudinal ends of the kiln project from the chamber with the portion of the kiln between the opposite longitudinal ends being contained within the chamber, the chamber being fixed against rotation so that the kiln rotates therein and there is established an adjacency at and between the chamber and the rotating kiln through which passage of gas between the interior of the chamber and ambient air outside of the chamber may occur;

providing within the chamber multiple combustion zones comprising an inner combustion zone and outer combustion zones located on opposite sides of the inner combustion zone and adjacent the adjacency between the chamber and the kiln wherein the inner combustion zone is separated from ambient air at least by the outer combustion zones;

combusting a hydrocarbon fuel to provide high temperature combustion gases having a relatively low oxygen concentration of below about 2 percent;

providing the high temperature combustion gases within the inner and outer combustion zones of the chamber so that the high temperature combustion gases contact the external surface of the rotating kiln contained within the chamber such that heat is indirectly transferred to the interior space of the kiln through the wall of the kiln from the external surface thereof to thereby heat the matrix material advancing through the kiln in an indirect manner and cause components of the organic substances and water therein to be released from the material as vapor;

maintaining the pressure in the inner combustion zone of the chamber at least as high as the pressure in the outer zones to limit movement of gas from the outer zones to the inner zone;

conducting high temperature combustion gases from the chamber predominantly only from the inner zone into the kiln to provide a purge gas with an oxygen content below about 2 percent for being conducted through the kiln adjacent the advancing material to displace the vapor from adjacent the surface of the advancing material, whereby an increase in the oxygen concentration of combustion gases conducted from the chamber due to infiltration of ambient air through the adjacency between the chamber and the kiln is avoided;

controlling the flow velocity of the purge gas to provide a relatively low flow velocity of from about 0.5 feet per second to about 10 feet per second to gently sweep the vapor from the material advancing through the kiln so as to avoid entrainment of particulate matter in the purge gas and to thereby produces an off-gas mixture containing the purge gas together with collected vapor and having a relatively low level of particulates;

maintaining air infiltration to the rotating kiln at a sufficiently low rate to avoid an increase in the level of oxygen contained in the purge gas flowing through the kiln to a level at which sufficient oxygen would exist to support combustion of organic vapors released from the materials;

removing the off-gas mixture from the kiln;

treating the off-gas mixture following the removal from the kiln to render the off-gas mixture acceptable for discharge to the atmosphere; and discharging the material from the discharge end of the kiln substantially free of the hazardous organic substances.

* * * * *